March 1, 1938. W. L. CLOUSE 2,109,940
BRAKE
Filed July 13, 1935
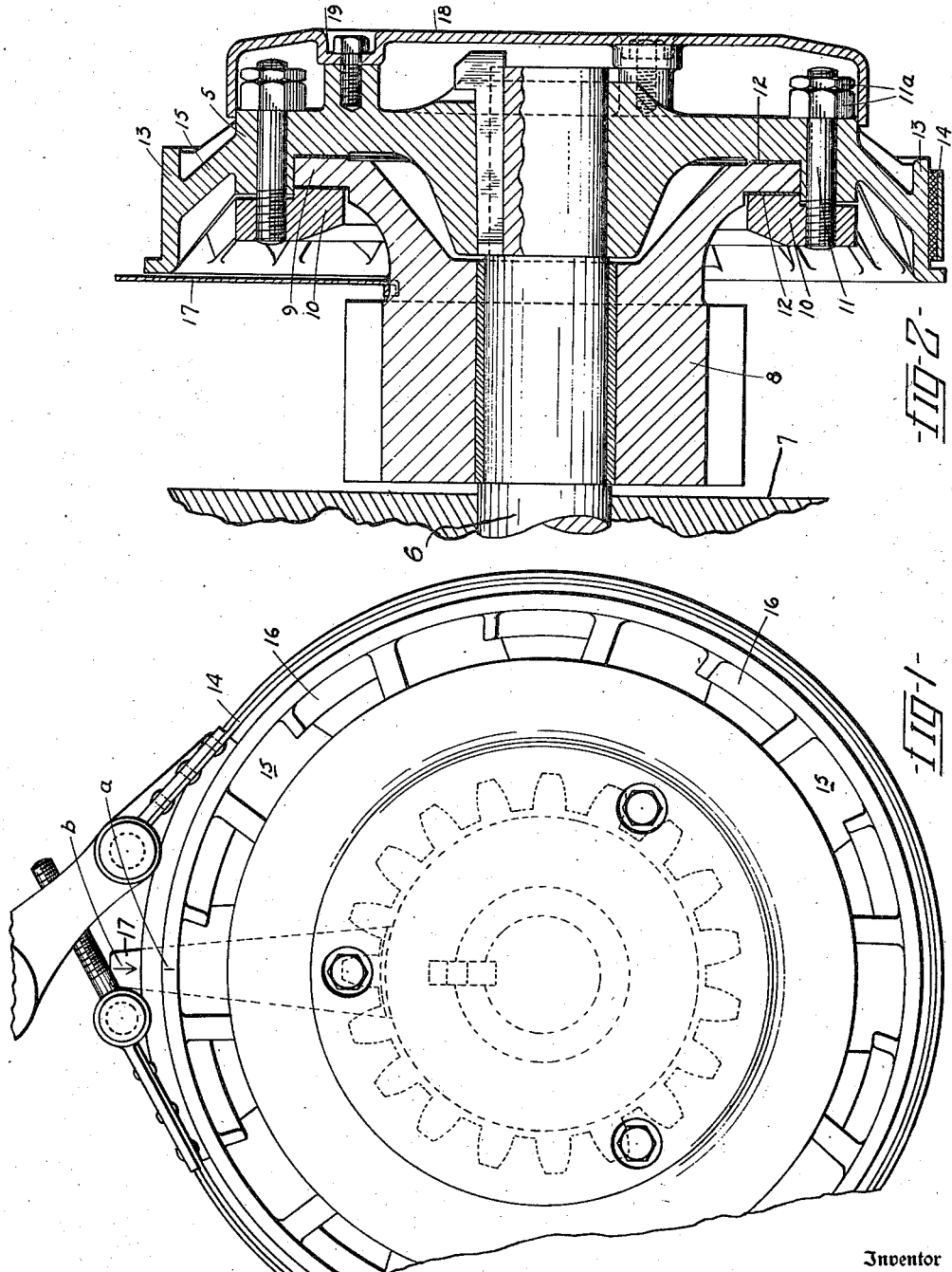
Inventor
WILLIAM L. CLOUSE
By Richey & Watts
Attorneys Patented Mar. 1, 1938

2,109,940

UNITED STATES PATENT OFFICE 2,109,940

BRAKE

William L. Clouse, Tiffin, Ohio, assignor to The National Machinery Company, Tiffin, Ohio, a corporation of Ohio Application July 13, 1935, Serial No. 31,252

4 Claims. (Cl. 188—1)

This invention relates to a torque transmitting mechanism and more particularly to a frictional drive and brake mechanism for a forging machine or the like.

Due to the massive parts set in motion and the tremendous forces developed in forging machines, bolt machines, presses and other heavy duty machinery, it is important that safety devices be arranged in the driving gear train to prevent the transmission of torque overloads such as might damage the dies or other machine parts. When a friction clutch is incorporated in the flywheel of a forging machine as disclosed in my co-pending application, Serial No. 31,251, filed July 13, 1935 and the forging machine is stalled due to an overload effecting slippage of a friction slip safety device or slippage in the clutch, it is desirable to be able to ascertain in which device the slippage occurred. It is also desirable to maintain at all times a brake means which will function to stop the machine during a part of its cycle and since the inertia of the parts in motion is considerable, the energy dissipated as heat through the brake is also considerable. The recent improvements in forging machines tending to increase their speed of operation has increased the difficulty of successful brake operation and said difficulties are generally attributed to the heat generated in the brake.

It is among the objects of this invention to provide a brake and friction drive mechanism wherein a single element fixed to a driving shaft will function to transmit the normal driving torque required to operate the machine, which will be inoperative to transmit torque overloads and which will act as a brake to stop the machine. A further object of the invention is to provide a brake for a forging machine wherein fan blades are formed within the brake to force air transversely of the braking surface. A further object of the invention is to provide an indicator means on a brake enclosed friction drive member to indicate the angular movement between the driving and driven parts of the friction drive.

Other objects relating to details of construction and economies of manufacture will appear hereinafter.

In the accompanying drawing which illustrates a preferred embodiment of the invention:

Figure 1 is an elevation of the brake and friction drive assembly;

Figure 2 is a vertical sectional view taken on line 2—2 of Figure 1.

Referring to the drawing the combined brake and drive wheel 5 is keyed to the clutch and flywheel shaft 6 which is arranged to extend transversely of the forging machine bed frame. Rotatably mounted upon the shaft 6 and disposed between the wheel 5 and the outer wall of the bed frame 7 is a spur gear 8 which meshes with a gear on the crankshaft (not shown). To transmit the torque imparted to the wheel 5 by the flywheel to the gear 8 and thence to the header slide the outer edge of the driven gear 8 is provided with a radially extending flange 9. A clamping ring 10 secured to the driving wheel 5 by means of the bolt 11 is employed to frictionally bind the flange 9 to the wheel. Friction material rings 12 may be inserted between the abutting faces of the flange 9 and the wheel and clamp ring parts.

The clamp ring 10 is drawn towards the wheel 5 sufficiently to transmit the normal force of drive by means of the nuts 11a on bolt 11. In the event of an overload such as would accompany a jam in the forging dies, slippage will occur between the flange 9 and the wheel 5. This slippage will prevent the transmission of the kinetic energy of the flywheel through the driven gear 8 to the header slide and thence to the jammed parts.

To stop the forging machine when the header slide has reached the limit of its receding motion, a brake band 14 is provided which is arranged to encompass the rim portion 13 of the wheel 5. Preferably the wheel 5 is solid for the major portion of its diameter to provide a solid clamp anchorage for the friction slip device and is provided with spokes 15 adjacent its outer perimeter. The spokes are formed as radially extending spiral blades which draw air inwardly therebetween to carry away the heat developed in the rim 13 by the application of the brake. Spiral ribs 16 are arranged between the spoke-blades 15 and in addition to supplementing the fan effect of the spoke-blades, increase the heat radiating surface of the rim 13.

To measure the amount of slippage through the friction slip device 9—10 occasioned by an overload as heretofore described, the hub of the gear 8 has mounted thereon an indicator blade 17 which is proportioned to extend beyond the perimeter of the rim 13 of the brake drum. The center line of the blade is preferably marked as shown at $b$ and prior to the operation of the machine a chalk mark $a$ is applied to the rim 13 in alignment with mark $b$. In the event of a shock or overload through the driving mechanism such as would cause a slip of the friction drive 9—10, the slip may be measured by the angular relation between the marks a and b. The nuts 11a may be adjusted to effect a torque transmission through the friction drive 9—10 sufficient for normal operation of the machine and the angular displacement of the marks a and b due to overload slippage indicate an application of overload forces. Since as a practical matter the crankshaft gear and the spur gear 8 which drives said gear must be arranged adjacent the outer wall of the bed frame and since the brake wheel is arranged on the spur gear shaft, it would be impossible to mark or observe the friction slip and thus impossible to ascertain whether an overload caused slippage in the clutch or in the friction slip.

To enclose the friction drive adjusting means 11a and the end of the shaft a guard 18 in the form of a flanged disc is secured to the wheel 5. The guard may be economically drawn from sheet metal and the fastening means are preferably countersunk as at 19.

During the operation of the machine the dual function of the wheel 5 is to transmit the drive through the friction means 9—10 and receive the braking effect of the brake band 14. The rotation of the wheel 5 through the fan blades 15 and 16 thereon draws cooling air currents along the inner surface of the rim and thereby prevents any heating of the brake band or warping of the wheel 5. Since any warping of the wheel due to heat would adversely affect the friction drive 9—10, the cooling means in this manner contributes to the efficient operation of the friction drive.

Although a preferred embodiment of the invention has been described in considerable detail, it is to be understood that modifications and rearrangements may be made without departing from the spirit and scope of the invention as defined by the following claims.

I claim:

1. In combination, a forging machine having a bed frame and a shaft projecting from the side thereof, a brake wheel keyed to said shaft at the outer end thereof, a gear rotatably mounted on said shaft intermediate said wheel and the outer wall of said bed frame, means integrally formed with said gear frictionally secured to said wheel, a brake drum formed at the outer periphery of said wheel, the diameter of said wheel exceeding the diameter of said gear and said means to effectively encompass and conceal said gear and said means, an indicator fixed to said gear extending radially therefrom and projecting beyond the edge of said brake drum to indicate the relative movement between said gear and wheel occasioned by slippage through said means and a brake band arranged about said drum to retard said gear rotation through said means.

2. In combination, a forging machine having a bed frame and a shaft projecting from the side thereof, a brake wheel keyed to the outer end of said shaft, a gear rotatably mounted on said shaft intermediate said wheel and the outer wall of said bed frame, said wheel provided with an enlarged radially extending hub portion, said gear provided with an outwardly flared flange having a radial surface arranged to abut the radial surface of said wheel hub portion, clamping means to frictionally secure said gear flange to said wheel hub through said abutting radial surfaces comprising a ring concentrically arranged with respect to said gear and hub having an annular surface parallel to said radial surfaces of said wheel and gear, a plurality of studs carried by said ring extending through a like plurality of apertures in said wheel hub and projecting beyond the outer surface thereof, adjusting nuts arranged at the projecting ends of said studs to draw the ring toward said hub and establish a frictional engagement between said gear flange and said wheel, a plurality of spokes extending radially from said wheel hub, said spokes inclined toward the bed frame of said machine and supporting at their ends a brake drum concentric with said hub, a brake band surrounding said brake drum arranged upon actuation to positively apply a braking action to said shaft through said hub and to impositively apply a braking action to said gear through said gear-to-hub frictional engagement.

3. In a forging machine having a bed frame and a rotatable shaft projecting from the side thereof, a brake wheel keyed to said shaft at the outer end thereof, a driven gear rotatably mounted on said shaft intermediate the outer wall of said bed frame and said wheel, said wheel comprising a hub portion and a radially extending portion secured thereto, said gear having an integrally formed radially extending portion arranged adjacent the radial portion of said wheel, frictional drive means slippable in response to overloads interposed between radial abutting surfaces on said gear and wheel, means to clamp said gear and wheel together to establish a frictional drive between said gear and said shaft, and a brake band arranged about said wheel to retard the gear through the friction drive means.

4. In combination, a forging machine having a bed frame, a fly wheel shaft extending transversely of the bed frame and having one end thereof projecting beyond the outer wall of the bed frame, a brake wheel keyed to the projecting end of said fly wheel shaft and a spur gear mounted on said shaft intermediate said brake wheel and the outer wall of the bed frame, a friction drive means slippable in response to torque overloads connecting said gear and said brake wheel, the maximum diameter of said gear and said friction drive means being less than the maximum diameter of said brake wheel whereby said gear and friction drive means is effectively concealed by said brake wheel and an indicator device projecting radially from said gear beyond the periphery of said brake wheel to indicate the relative movement between said gear and said brake wheel occasioned by an overload effecting slippage between said gear and wheel.

WILLIAM L. CLOUSE.